United States Patent
Patel et al.

(10) Patent No.: US 9,016,948 B2
(45) Date of Patent: Apr. 28, 2015

(54) FLANGED HALF-BEARING (71) Applicants: MAHLE International GmbH, Stuttgart (DE); MAHLE Engine Systems UK Limited, Northampton (GB)

(72) Inventors: Anant Patel, Rugby (GB); Ha Tran, Rugby (GB); Nathan Fisher, Rugby (GB); Philip James, East Hunsbury (GB); Bredo Leipprand, Stuttgart (DE); Marcus Paul, Crick (GB)

(73) Assignees: MAHLE International GmbH, Stuttgart (DE); MAHLE Engine Systems UK Limited, Northampton (GB)

( * ) Notice: Subject to any disclaimer, the term of this patent is extended or adjusted under 35 U.S.C. 154(b) by 0 days.

(21) Appl. No.: 14/356,421

(22) PCT Filed: Nov. 7, 2012

(86) PCT No.: PCT/EP2012/004631
§ 371 (c)(1),
(2) Date: May 6, 2014

(87) PCT Pub. No.: WO2013/068106
PCT Pub. Date: May 16, 2013

(65) Prior Publication Data
US 2014/0314356 A1    Oct. 23, 2014

(30) Foreign Application Priority Data
Nov. 7, 2011    (GB) .................................. 1119174.9

(51) Int. Cl.
*F16C 9/02*    (2006.01)
*F16C 43/02*    (2006.01)
*F16C 17/10*    (2006.01)

(52) U.S. Cl.
CPC . *F16C 9/02* (2013.01); *F16C 43/02* (2013.01); *F16C 17/10* (2013.01); *F16C 2226/12* (2013.01)

(58) Field of Classification Search
CPC ............ F16C 9/02; F16C 43/02; F16C 17/10; F16C 2226/12
USPC .......................... 384/275, 294, 425, 429, 430
See application file for complete search history.

(56) References Cited

U.S. PATENT DOCUMENTS

| 4,533,261 A | 8/1985 | Losio |
| 5,062,718 A | 11/1991 | Lenhard-Backhaus et al. |

(Continued)

FOREIGN PATENT DOCUMENTS

| EP | 0 298 953 A1 | 1/1989 |
| GB | 2 225 392 A | 5/1990 |
| WO | 2009/062904 A1 | 5/2009 |

OTHER PUBLICATIONS

International Search Report of PCT/EP2012/004631, mailed Mar. 4, 2013.

(Continued)

*Primary Examiner* — Thomas R. Hannon
(74) *Attorney, Agent, or Firm* — Collard & Roe, P.C.

(57) ABSTRACT

A flanged half-bearing includes at least one substantially semi-annular thrust washer with an internal periphery having lateral lugs and an intermediary stabilization lug projecting from the internal periphery of the thrust washer, and a semi-cylindrical half journal bearing shell having lateral recesses and an intermediary stabilization recess that are recessed into an axial end face of the bearing shell and are respectively connected to the lateral lugs and the stabilization lug of the thrust washer, wherein the stabilization lug has rotational stabilization edges that project substantially perpendicularly from the inner periphery of the thrust washer, and the stabilization recess is configured for axial relative movement of stabilization lug. An engine includes at least one such flanged half-bearing.

13 Claims, 9 Drawing Sheets

(56) References Cited

U.S. PATENT DOCUMENTS

| | | | |
|---|---|---|---|
| 6,471,405 B1* | 10/2002 | Bickle et al. | 384/294 |
| 8,376,618 B2 | 2/2013 | Lehmann et al. | |
| 2003/0128902 A1 | 7/2003 | Kennedy | |
| 2010/0260449 A1* | 10/2010 | Lehmann et al. | 384/456 |
| 2010/0266228 A1* | 10/2010 | Pierotti Ferreira | 384/275 |

OTHER PUBLICATIONS

International Search Report and Written Opinion of the International Searching Authority of PCT/EP2012/004631, mailed Mar. 4, 2013.

* cited by examiner

FLANGED HALF-BEARING

CROSS REFERENCE TO RELATED APPLICATIONS

This application is the National Stage of PCT/EP2012/004631 filed on Nov. 7, 2012, which claims priority under 35 U.S.C. §119 of Great Britain Application No. 1119174.9 filed on Nov. 7, 2011, the disclosures of which are incorporated by reference. The international application under PCT article 21(2) was published in English.

The present invention relates to a flanged half-bearing having a semi-cylindrical journal bearing shell and at least one semi-annular thrust washer, and particularly to a flanged half-bearing for an internal combustion engine.

BACKGROUND

The level of relative movement between a semi-annular thrust washer (also known as a thrust flange) and the semi-cylindrical journal bearing shell to which it is connected is of great importance, with respect to providing greater uniformity of wear within a bearing assembly, and ensuring correct assembly.

It is known to machine the bearing shells and washers of half-bearings in a single piece construction. Commonly, it is also known to firmly connect thrust washers to a bearing shell. For example, it is known to firmly and permanently connect thrust washers to a bearing shell by inserting lugs that are located on the inner periphery of the thrust washer into open-ended recesses in the axial end faces of the bearing shell, before mechanically deforming the bearing shell adjacent to the recesses to trap the lug within a dovetail connection. Such a flanged half-bearing is disclosed in GB2225392. It is also known to form such firm connections by use of tightly fitting dovetail shaped connections.

In use, flanged half-bearings are located within a housing, such as an engine block. Disadvantageously, a rigid connection between the thrust washers and the bearing shell can lead to unwanted gaps between the thrust washers and the housing. Such gaps can result in regions of unsupported load that could result in flexure and fatigue of the washers.

Furthermore, a rigid connection between the thrust washers and the bearing shell can result in a reduced contact area between the thrust washers and the housing, which provides poor heat transfer between the thrust washers and the housing, and may result in overheating of the thrust washers, leading to a reduction in the viscosity of the lubricating oil. A reduced oil viscosity leads to a reduction in the oil film thickness, resulting in increased wear of the bearing shell and the thrust washer.

Further, in the case that the connection is made by mechanical deformation of the bearing shell, this causes swelling of the surrounding material. In such cases it is typically necessary to perform a post-connection machining stage to remove the material swell that projects from the cylindrical inner surface of the bearing shell, which increases costs and prevents the use of performance enhancing coatings on the inner surface of the bearing shell.

It is also known to connect thrust washers to a bearing shell with hooking lugs projecting from and close to the ends of the internal periphery of the thrust washer, which loosely connect within open-ended hooking recesses in the axial end faces of the bearing shell. The bearing is assembled by elastically reducing the radius of curvature of the bearing shell before aligning with the thrust washers, such that the bearing shell radially expands back into shape, when released, and is loosely retained on the thrust washer. Such a bearing is disclosed in U.S. Pat. No. 4,533,261.

Disadvantageously, such a thrust washer is not connected to the bearing shell circumferentially intermediate the two hooking lugs and, in use, can experience a level of relative axial movement in that region that causes enhanced wear. Further, the design of hooking lug that is particularly favourable for the purposes of assembly provides only a limited amount of resistance against rotation of the thrust washer about the axis of the crankshaft, within the housing, which is particularly damaging. Additionally, such thrust washers can be vulnerable to incorrect assembly, potentially including damage occurring during the incorrect assembly, both of which can further enhance wear during use.

SUMMARY OF THE DISCLOSURE

According to a first aspect, there is provided a flanged half-bearing comprising
  at least one substantially semi-annular thrust washer with an internal periphery having lateral lugs and an intermediary stabilisation lug projecting from the internal periphery of the thrust washer, and
  a semi-cylindrical half journal bearing shell having lateral recesses and an intermediary stabilisation recess that are recessed into an axial end face of the bearing shell and are respectively connected to the lateral lugs and the stabilisation lug of the thrust washer, wherein
  the stabilisation lug has rotational stabilisation edges that project substantially perpendicularly from the inner periphery of the thrust washer, and the stabilisation recess is configured for axial relative movement of stabilisation lug.

According to a second aspect, there is provided an engine comprising at least one flanged half-bearing comprising
  at least one substantially semi-annular thrust washer with an internal periphery having lateral lugs and an intermediary stabilisation lug projecting from the internal periphery of the thrust washer, and
  a semi-cylindrical half journal bearing shell having lateral recesses and an intermediary stabilisation recess that are recessed into an axial end face of the bearing shell and are respectively connected to the lateral lugs and the stabilisation lug of the thrust washer, wherein
  the stabilisation lug has rotational stabilisation edges that project substantially perpendicularly from the inner periphery of the thrust washer, and the stabilisation recess is configured for axial relative movement of stabilisation lug.

The lateral lugs may be lateral hooking lugs and the lateral recesses may be lateral hooking recesses, which are configured to interconnect by hooking together.

The hooking lugs each may have mutually facing latching edges that converge towards the opening between the ends of the inner periphery of the thrust washer.

The hooking recesses each may have side edges remote from the circumferential ends of the thrust bearing configured such that they have a smaller circumferential separation adjacent the inner periphery of the thrust washer.

The stabilisation recess may have side edges that extend perpendicular to the axial end face of the bearing shell.

The stabilisation recess may be a generally rectangular recess.

The stabilisation recess may have a greater axial length than the axial thickness of the stabilisation lug.

The stabilisation lug may be located midway between the ends of the thrust washer, along the inner periphery of the thrust washer.

The stabilisation lug may be asymmetrically located along the inner periphery of the thrust washer with respect to ends of the thrust washer.

A plurality of stabilisation lugs may be provided circumferentially between the lateral lugs and projecting from the internal periphery of the thrust washer, and a corresponding plurality of stabilisation recesses may be provided in the axial end face of the bearing shell.

The centres of one or more of the plurality of stabilisation lugs and corresponding stabilisation recesses may be spaced apart from the crown by an angle of no more than 45°, preferably no more than 30°, more preferably no more than 20°, and most preferably no more than 10°. The one or more stabilisation lugs and corresponding stabilisation recesses are spaced apart from the lateral lugs provided proximate the ends (i.e. the substantially radial joint faces) of the thrust washer and the lateral recesses provided proximate the joint faces of the bearing shell. Accordingly, axial movement of the crown of the thrust washer relative to the bearing shell is permitted but limited, by the provision of these one or more stabilisation lugs and corresponding stabilisation recesses.

The plurality of stabilisation lugs and stabilisation recesses may be asymmetrically arranged located along the inner periphery of the thrust washer with respect to ends of the thrust washer.

The flanged half-bearing may comprise two thrust washers connected to opposed axial ends of the bearing shell.

The thrust washer may have a main body section and the stabilisation lug projects out of coplanar alignment with the main body section.

The stabilisation lug may diverge away from the plane of the main body section along its length.

The stabilisation lug may have a terminal portion that is parallel and perpendicularly displaced from the plane of the main body section.

BRIEF DESCRIPTION OF THE DRAWINGS

Embodiments of the invention are further described hereinafter with reference to the accompanying drawings, in which.

DETAILED DESCRIPTION

Like numbers refer to like elements throughout.

FIGS. 1A to 1F, FIGS. 2A to 2E and FIGS. 3A to 3C illustrate a flanged half-bearing and its component parts according to an embodiment.

Figures 1A, 1B:
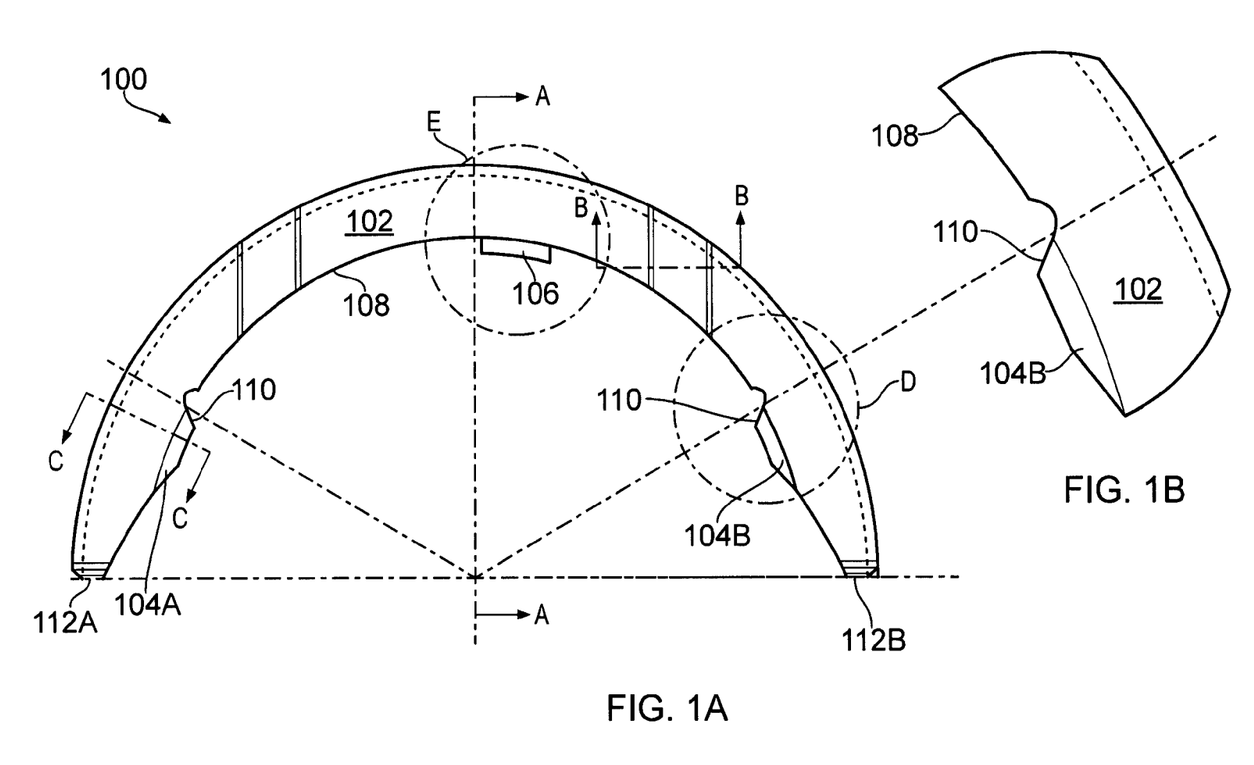
FIGS. 1A to 1F illustrate a substantially semi-annular thrust washer.
Figures 1C, 1D, 1E, 1F:
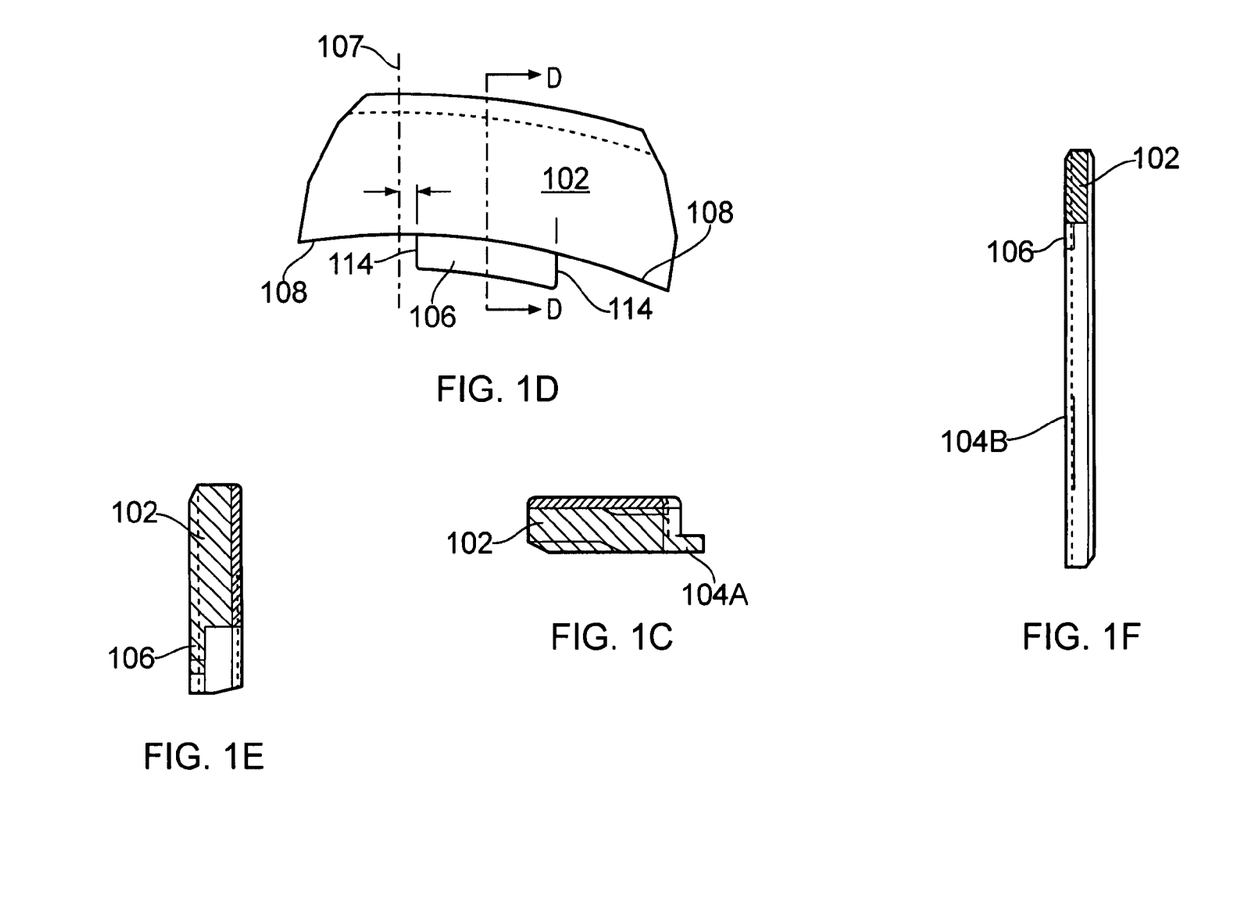

FIG. 1A illustrates an axial view of a substantially semi-annular thrust washer 100 having a generally semi-annular main body portion 102 with hooking lugs 104A and 104B and a stabilisation lug 106 projecting from the inner periphery 108. The hooking lugs 104A and 104B have latching edges 110 that face generally towards the opposite ends 112 of the thrust washer 100, as is shown further in the enlarged view of FIG. 1B, corresponding with circle D of FIG. 1A. FIG. 1C shows an axially cross-sectional view through the thrust washer 100 at the hooking lug 104A, illustrating that in the first embodiment the lug is thinner than the main body 102 of the thrust washer, to facilitate hooking to a hooked recess in a bearing shell.

FIG. 1D illustrates an enlarged view of the stabilisation lug 106, corresponding with the circle E in FIG. 1A. The stabilisation lug 106 has rotational stabilisation edges 114 that project substantially perpendicularly from the inner periphery 108 of the thrust washer 100.

The stabilisation lug 106 has a circumferential width (around the inner periphery 108 of the thrust washer 100) of 2.0 to 10.0.0 mm (e.g. 3.67 to 6.22 mm), a thickness (parallel to the axis of the crankshaft) of 0.5 to 5.0 mm (e.g. 2.36 to 3.43 mm) (the main body portion 102 may also have a corresponding thickness of 0.5 to 5.0 mm), and a radial extension from the inner periphery of the thrust washer 100 of 1.0 to 5.0 mm (e.g. 1.8 to 3.1 mm). The stabilisation lug 106 is thinner than the main body portion 102 of the thrust washer 100. However, the stabilisation lug may alternatively be of the same thickness as the main body portion. In the illustrated embodiment, the stabilisation lug 106 is asymmetrically offset from the centre of the thrust washer 100 (i.e. from the mid-point of the inner periphery 108, between the ends 112) by 0.7 mm.

FIG. 1F illustrates a sectional view of thrust washer 100 along the plane indicated by line A-A in FIG. 1A. The thrust washer 100 may be manufactured by stamping, machine or cutting from a sheet material, with the thickness profiles of the lugs 104A, 104B and 106 being machined by an axially located cutter.

Figure 2A:
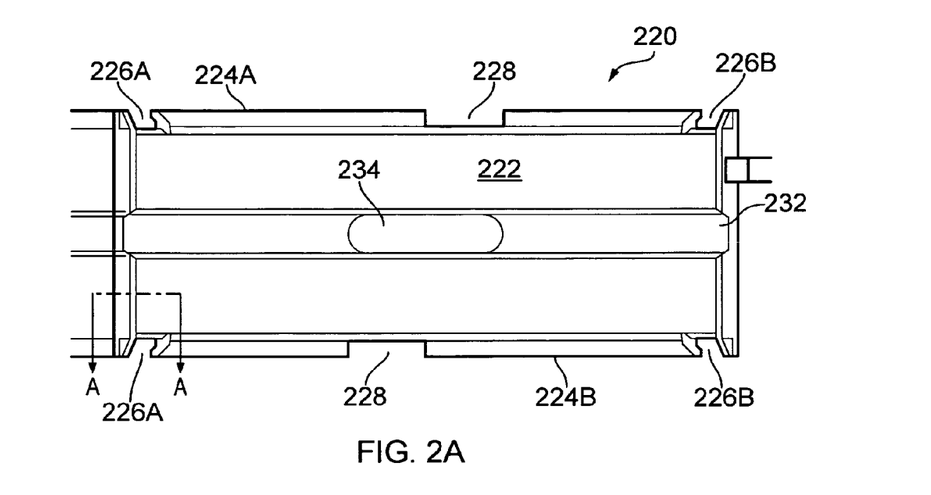
FIGS. 2A to 2E illustrate a semi-cylindrical half journal bearing shell.
Figure 2B:
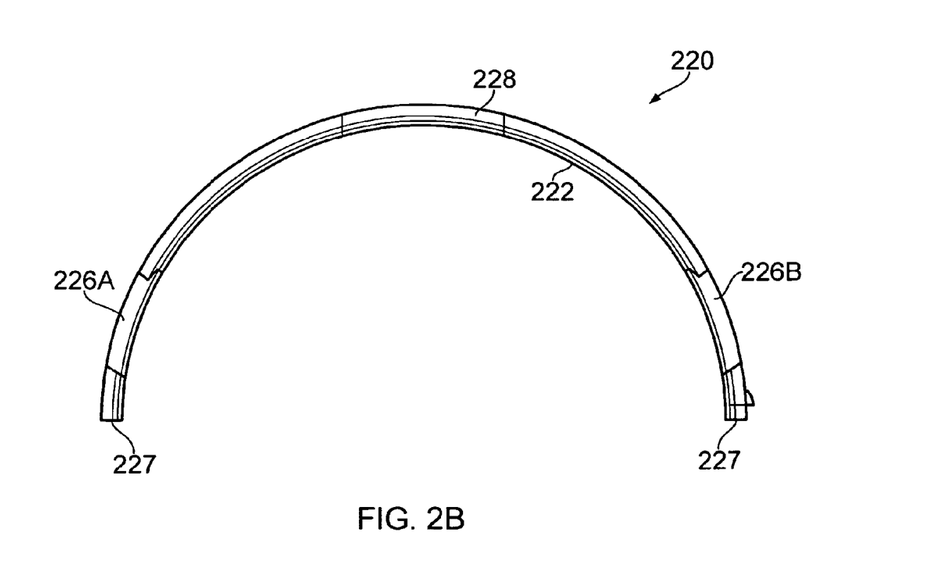
Figure 2C:
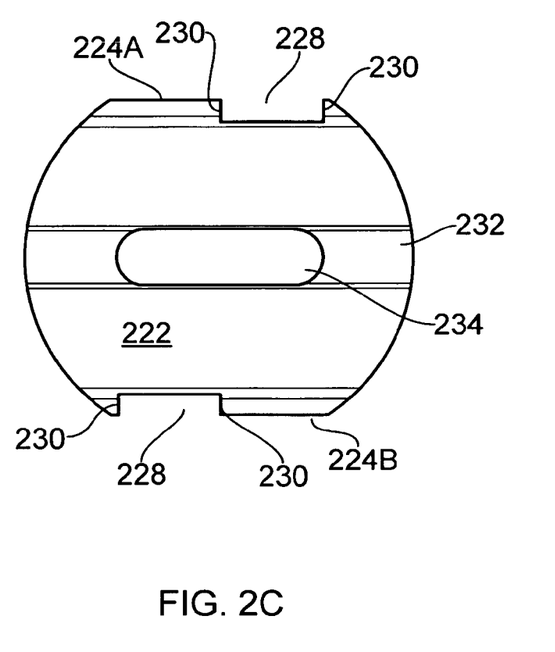

FIG. 2A shows a view of a semi-cylindrical half journal bearing shell 220 from the concave, inner surface 222, and FIG. 2B shows an axial side view of the bearing shell. The bearing shell 220 has axial end faces 224A and 224B, each of which has lateral hooking recesses 226A and 226B close to the joint faces 227 and a stabilisation recess 228. The bearing shell 220 is additionally provided with a circumferential groove 232 along the concave, inner surface 222, with an oil supply hole 234 through the thickness of the bearing shell. FIG. 2C shows an enlarged view of the central portion of the bearing shell 220, more clearly showing the rectangular shape of the recesses 228, which have parallel side edges 230 that run axially, perpendicular to the axial end faces 224A and 224B.

The stabilisation recess 228 is dimensioned in correspondence with the stabilisation lug 106 and the thickness of the thrust washer main body 102. The stabilisation recess 228 has a circumferential width (i.e. around the axial faces 224A and 224B) greater than the circumferential width of the stabilisation lug 106 by a total clearance of about 1 mm. The axial depth of the stabilisation recess is preferably greater than or equal to the axial thickness of the stabilisation lug 106, and may be about the same thickness as the main body 102 of the thrust washer 100. The stabilisation recess 228 is offset from the middle of the axial end of the bearing shell 220 in correspondence with the offset of the stabilisation lug 106 on the thrust washer 100. One of the side edges 230 is provided at the middle of the axial end of the bearing shell 220.

Figure 2D:
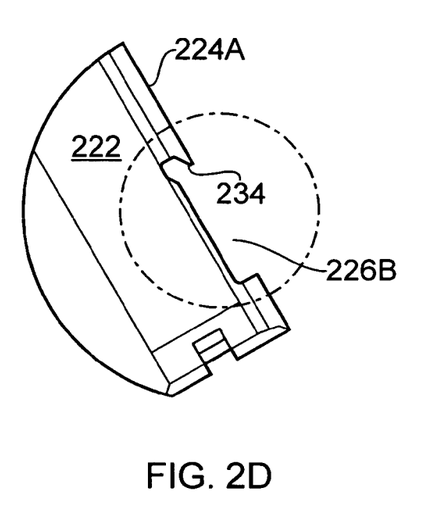
Figure 2E:
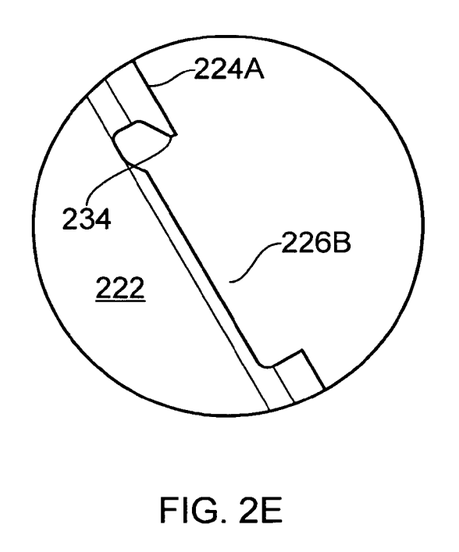

FIGS. 2D and 2E show enlarged views of the recess 226B, showing the hooking side edge 234, which is angled non-perpendicularly to the axial end face 224A, such that when a hooking lug 104A and 104B is connected within the recess, it is prevented from exiting the recess in an axial direction.

It will be appreciated that not all half-bearings may be provided with the groove 232 and/or the oil supply hole 234. In particular, when two half-bearings are used together, one may have such a groove and oil supply hole, and the other may not. Further, both half-bearings may be of the type described herein, or one may be such a half-bearing and the other may be a half-bearing of a known design.

Figure 3A:
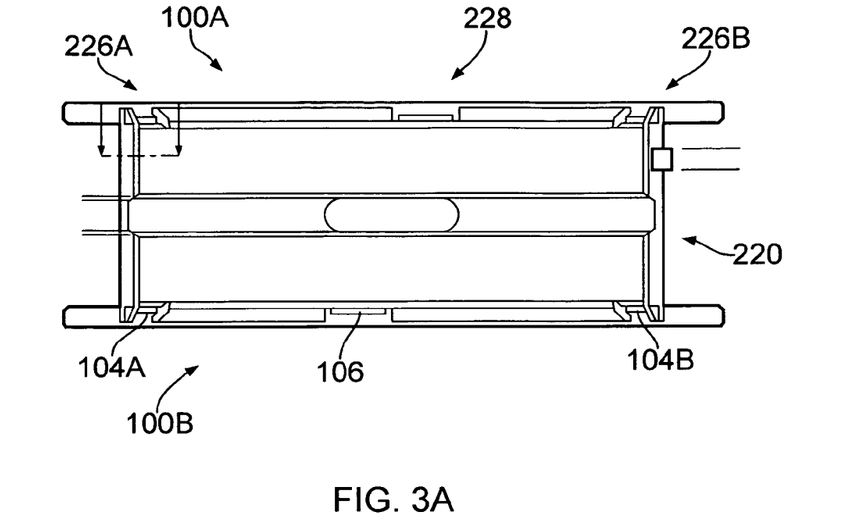
FIGS. 3A to 3C illustrate a flanged half-bearing.
Figure 3B:
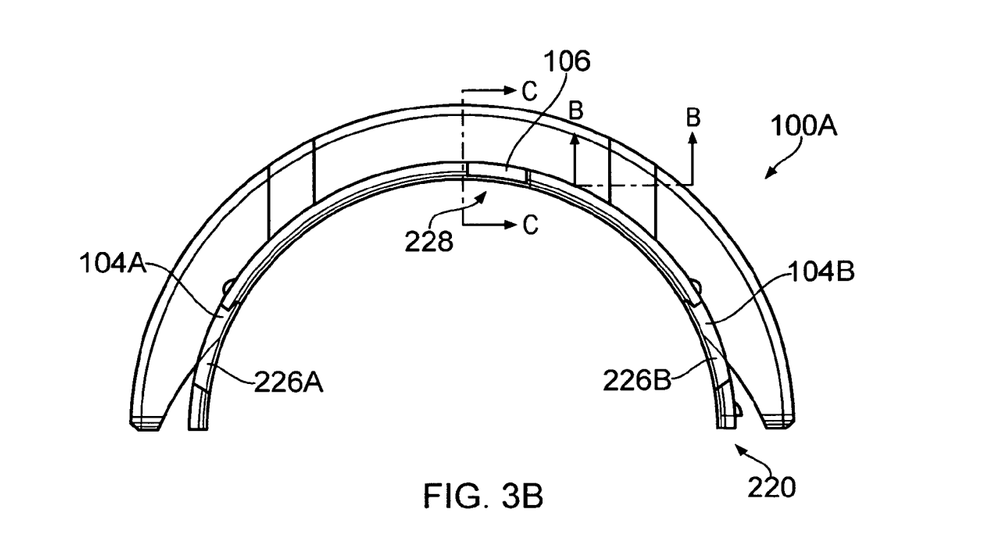
Figure 3C:
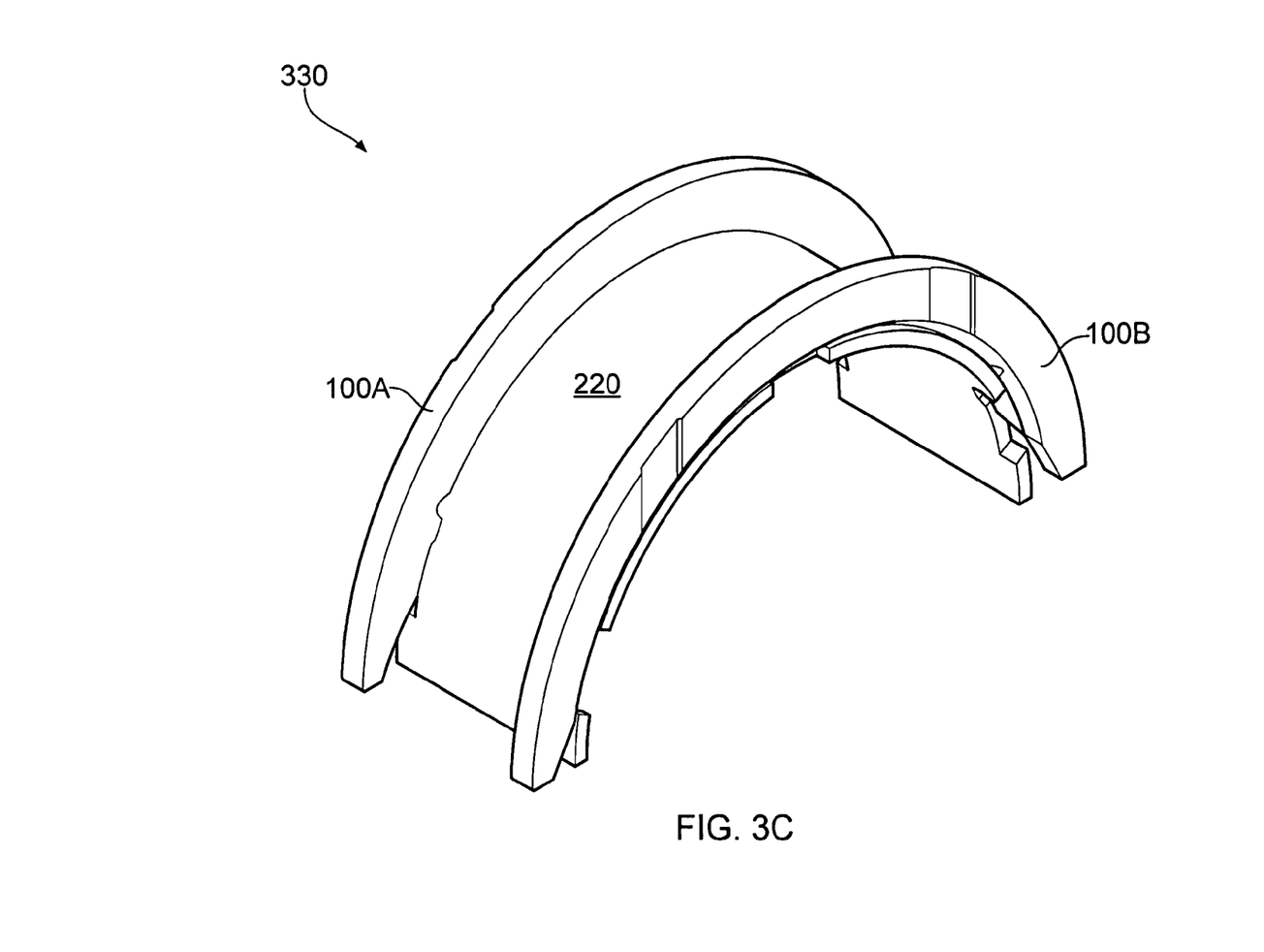

FIGS. 3A, 3B and 3C show views of an assembled flanged half-bearing 330 comprising a pair of semi-annular thrust washers 100A and 100B and a semi-cylindrical half journal bearing shell 220, which are connected together by the hooking lugs 104A and 104B being hooked within the hooking recesses 226A and 226B, and having the stabilisation lugs 106 received into the stabilisation recesses 228.

The half-bearing 330 is assembled by elastically bending the bearing shell 220 to a smaller radius of curvature, aligning with respect to the thrust washers 100A and 100B, and then releasing the bearing shell, so that it radially expands to engage the lugs 104A, 104B and 106 within the recesses 226A, 226B and 228. Accordingly, the thrust washers 100A and 100B become engaged upon the bearing shell 220, in a hooked manner. In particular, the latching edges 110 converge towards the opening between ends of the thrust washer 100, which prevents the engaged lugs 104A and 104B from exiting the recesses 226A and 226B perpendicular to the axis of the bearing. The angle of convergence may be between 40 and 50°.

Whilst permitting a small amount of relative axial play, the projection of the stabilisation lug 106 into the stabilisation recess 228 interlocks the thrust washer 100 with the bearing shell 220. This prevents substantial relative axial movement of the crown of the washer 100 and bearing shell 220. Further, the engagement of the rotational stabilisation edges 114 of the stabilisation lug 106 within the recesses 228, between the parallel side edges 230 of the recesses 228, prevents substantial relative rotational movement of the thrust washer(s) 100 and the bearing shell 220, with respect to the axis of the half-bearing 330, whilst again allowing a small amount of relative rotational play. Preventing substantive relative rotation about the axis of the bearing half-bearing 330 reduces the load and wear experienced by the hooking lugs 104A and 104B.

Figure 4A:
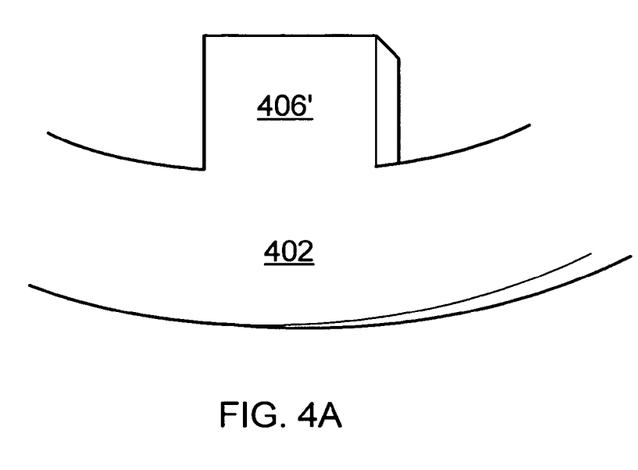
FIGS. 4A to 4C illustrate alternative stabilisation lugs of the thrust washer.
Figure 4B:
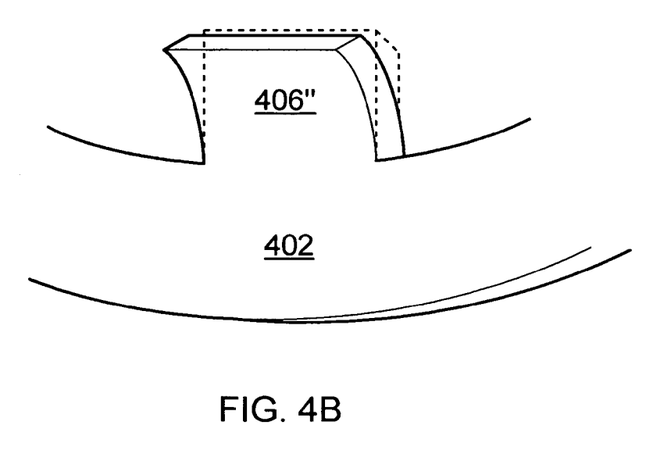
Figure 4C:
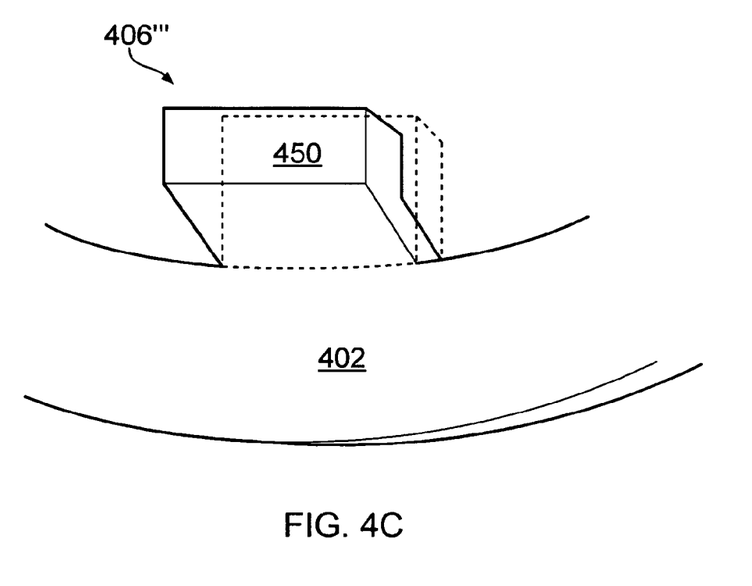

FIGS. 4A, 4B and 4C illustrate alternative stabilisation lugs 406', 406" and 406'". The lug 406' of FIG. 4A is of equal thickness to the main body 402 of the thrust washer, without being thinned, in contrast to the lug 106 of FIG. 1E. In the formation of such a thrust washer, an axially located, cammed cutter may be used to machine the hooking lugs 104A and 104B, without machining the stabilisation lug 406'. Such a lug 406' provides enhanced resistance both to axial relative movement of the thrust washer and the bearing shell, and also is stronger, thereby better preventing rotational relative movement.

Alternatively, to avoid the requirement to use a cammed cutter when machining the hooking lugs 104A and 104B, the stabilisation lug 406" and 406'" may be bent out of alignment with the main body 402 of the thrust washer. In FIG. 4B the lug 406" diverges from the plane of the main body 402, whereas in FIG. 4C the lug 406'" has a terminal portion 450 that is parallel with the main body 402, but overset from the plane of the main body. With such a lug, the bearing shell will be provided with a stabilisation recess having a greater axial length.

Advantageously, the provision of the stabilisation lug and cooperating stabilisation recess permits a small amount of relative rotational play, whilst preventing substantial relative rotational movement of the thrust washer and bearings shell. Further, advantageously the stabilisation lug and cooperating stabilisation recess permit a restricted level of axial relative movement of the thrust washer and bearing shell at the crown of the half-bearing, which is greater than that of corresponding components that are firmly connected by mechanical deformation or a dovetail connection, yet smaller than the corresponding relative axial movement in the absence of a lug and recess at that location. In particular, the stabilisation lug and cooperating stabilisation recess permit axial movement of the crown of the thrust washer away from the bearing shell, whilst limiting axial movement of the crown of the thrust washer towards the bearing shell.

FIG. 1A illustrates a stabilisation lug 106 that is closer to one end of 112B than the other 112A of the thrust washer 100, i.e. the centre of the lug is spaced to one side of the crown of the thrust washer, which corresponds with the centre line 107. Advantageously, provision of the stabilisation lug off-centre on the thrust washer (i.e. such that the thrust washer is not mirror symmetric, with respect to the location of the stabilisation lug) could prevent the thrust washer from being incorrectly connected to the bearing shell. However, alternatively, the stabilisation lug may be centrally located on the inner periphery of the thrust washer.

Figure 5:
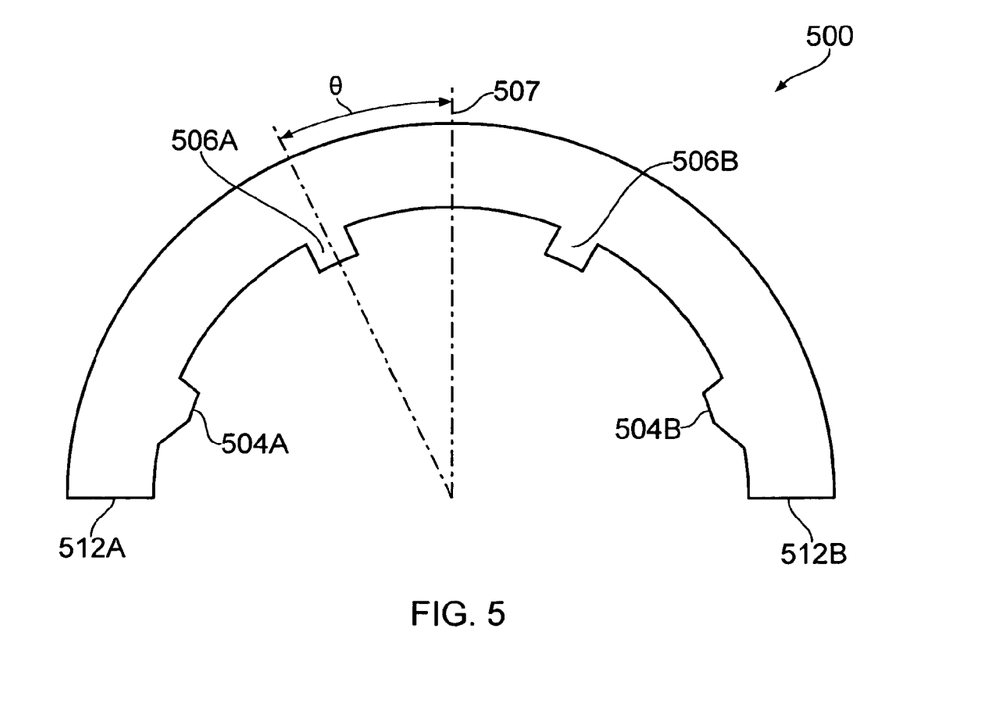
FIG. 5 illustrates a further substantially semi-annular thrust washer.

In a further embodiment the thrust washer may be provided with more than one stabilisation lug between the hooking lugs along the inner periphery, and the bearing shell may be provided with a corresponding number of stabilisation recesses in the axial end face(s). FIG. 5 illustrates such a thrust washer 500, which is provided with two stabilisation lugs 506A and 506B. The centres of the two stabilisation lugs 506A and 506B are each spaced apart from the crown (i.e. centre line 507) by an angle A of no more than 45° (preferably no more than 30°, more preferably no more than 20°, and yet more preferably no more than) 10°). The arrangement of the plurality of stabilisation lugs may be asymmetric with respect to the crown 507 and ends 512A and 512B of the thrust washer.

The figures provided herein are schematic and not to scale.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A flanged half-bearing comprising
  at least one substantially semi-annular thrust washer with an internal periphery having lateral lugs and an intermediary stabilization lug projecting from the internal periphery of the thrust washer,
and
  a semi-cylindrical half journal bearing shell having lateral recesses and generally rectangular intermediary stabilization recess that are recessed into an axial end face of the bearing shell and are respectively connected to the lateral lugs and the stabilization lug of the thrust washer,
wherein
  the stabilization lug has rotational stabilization edges that project substantially radially from the inner periphery of the thrust washer, and the stabilization recess has a greater axial length than the axial thickness of the stabilization lug for axial relative movement of the stabilization lug.

2. The flanged half-bearing according to claim 1, wherein the lateral lugs are lateral hooking lugs and the lateral recesses are lateral hooking recesses, which are configured to interconnect by hooking together.

3. The flanged half-bearing according to claim 2, wherein the hooking lugs each have mutually facing latching edges that converge towards the opening between the ends of the inner periphery of the thrust washer.

4. The flanged half-bearing according to claim 2, wherein the hooking recesses each have side edges remote from the circumferential ends of the thrust bearing configured such that they have a smaller circumferential separation adjacent the inner periphery of the thrust washer.

5. The flanged half-bearing according to claim 1, wherein the stabilization recess has side edges that extend perpendicular to the axial end face of the bearing shell.

6. The flanged half-bearing according to claim 1, wherein the stabilization lug is asymmetrically located along the inner periphery of the thrust washer with respect to ends of the thrust washer.

7. The flanged half-bearing according to claim 1, wherein a plurality of stabilization lugs are provided circumferentially between the lateral lugs and projecting from the internal periphery of the thrust washer, and a corresponding plurality of stabilization recesses are provided in the axial end face of the bearing shell.

8. The flanged half-bearing according to claim 7, wherein the centers of one or more of the plurality of stabilization lugs and corresponding stabilization recesses are spaced apart from the crown by an angle of no more than 45°.

9. The flanged half-bearing according to claim 7, wherein the plurality of stabilization lugs and stabilization recesses are asymmetrically arranged located along the inner periphery of the thrust washer with respect to ends of the thrust washer.

10. The flanged half-bearing according to claim 1, wherein the flanged half-bearing comprises two thrust washers connected to opposed axial ends of the bearing shell.

11. The flanged half-bearing according to claim 1, wherein the thrust washer has a main body section and the stabilization lug projects out of coplanar alignment with the main body section.

12. The flanged half-bearing according to claim 11, wherein the stabilization lug diverges away from the plane of the main body section along its length.

13. The flanged half-bearing according to claim 11, wherein the stabilization lug has a terminal portion that is parallel and perpendicularly displaced from the plane of the main body section.

* * * * *